Feb. 27, 1934.  A. BROADMEYER  1,949,239
RELATIVE SPEED INDICATOR
Filed Sept. 26, 1931  2 Sheets-Sheet 1
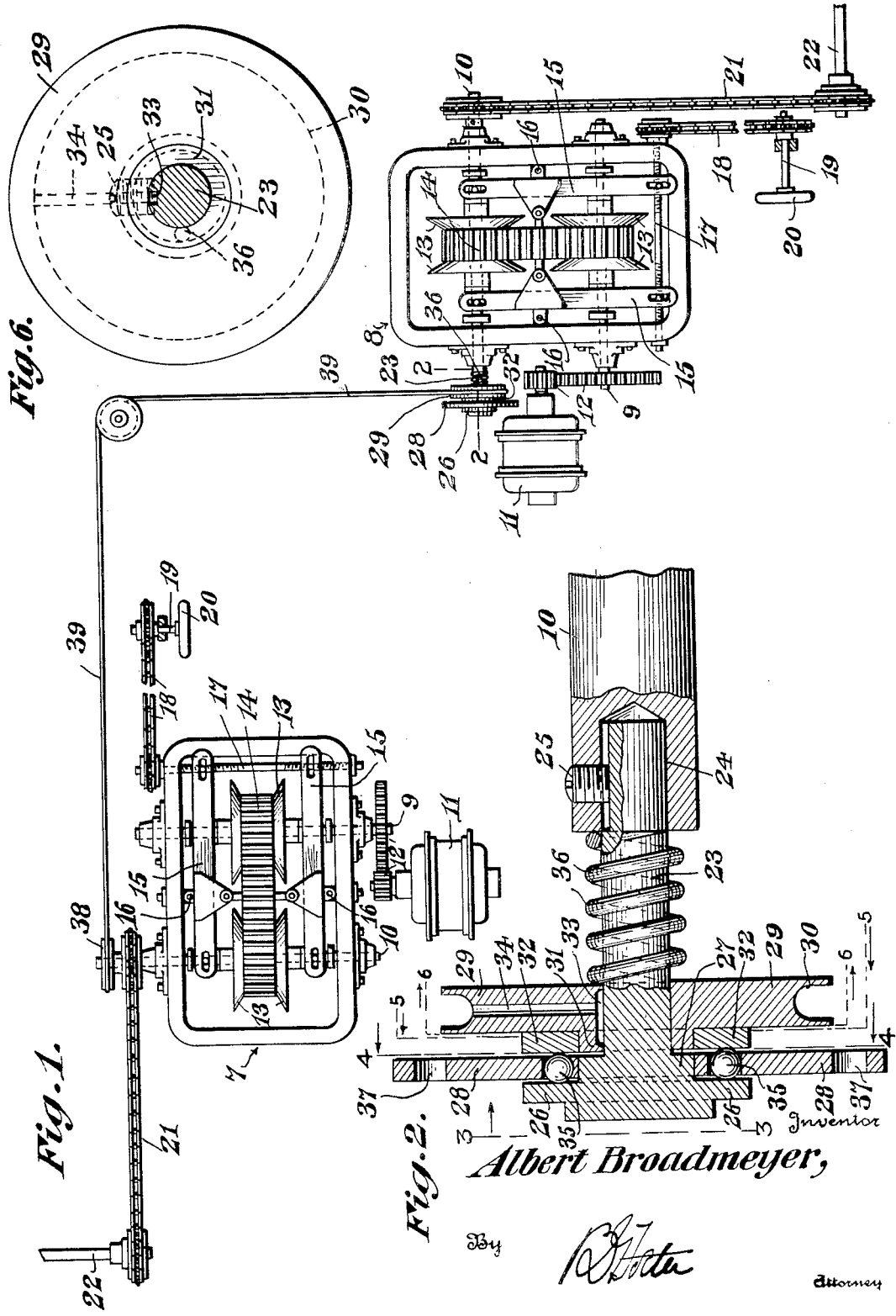
Inventor
Albert Broadmeyer,
By
Attorney Feb. 27, 1934.  A. BROADMEYER  1,949,239
RELATIVE SPEED INDICATOR
Filed Sept. 26, 1931  2 Sheets-Sheet 2
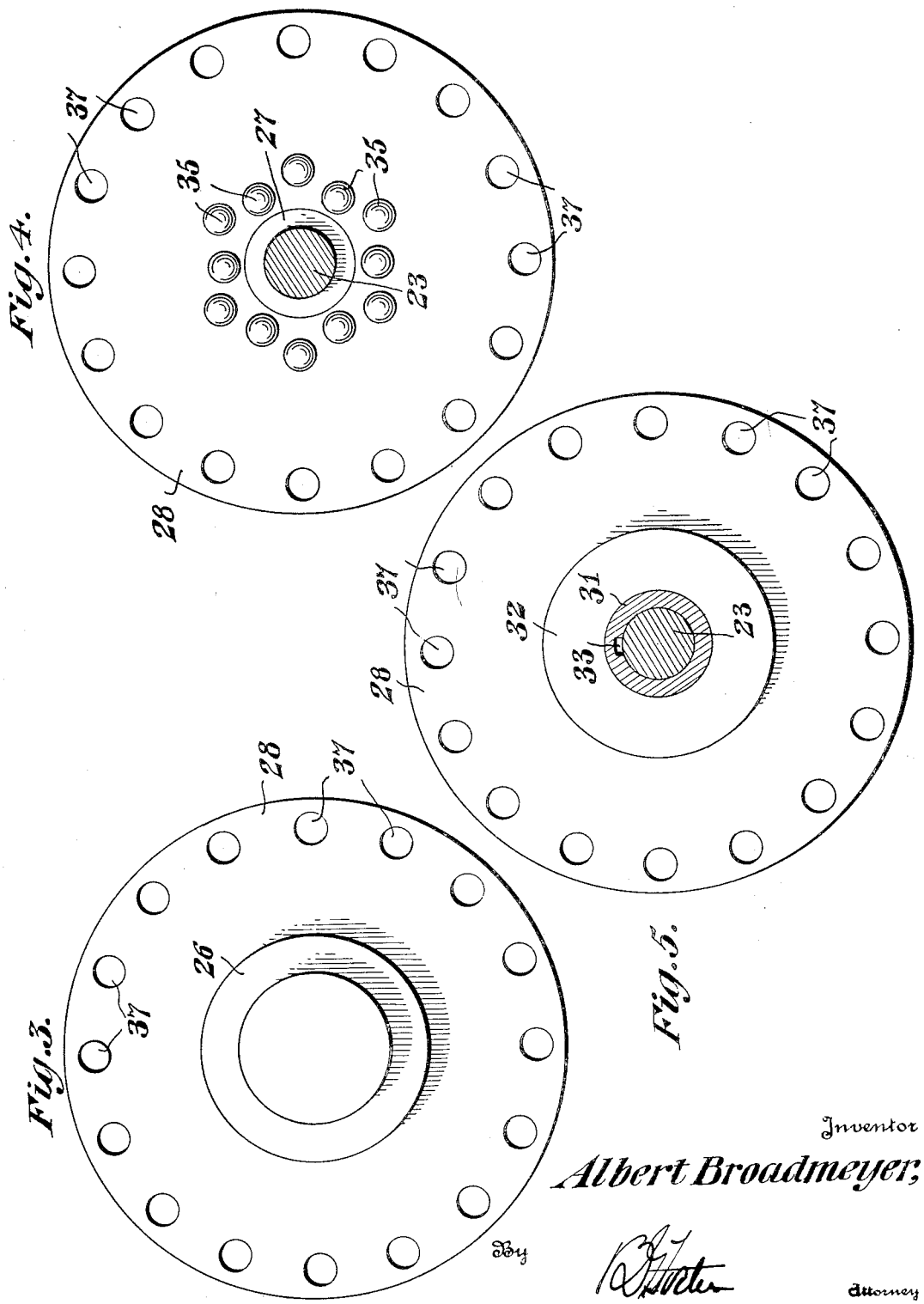
Inventor
*Albert Broadmeyer*
By
Attorney Patented Feb. 27, 1934

1,949,239

UNITED STATES PATENT OFFICE 1,949,239

RELATIVE SPEED INDICATOR

Albert Broadmeyer, Harrisburg, Pa., assignor to W. O. Hickok Manufacturing Company, Harrisburg, Pa., a corporation of Pennsylvania Application September 26, 1931
Serial No. 565,392

5 Claims. (Cl. 235—103.5)

The object of the present invention is to provide a simple, novel and effective means for definitely indicating when two mechanisms are operating at the same speed and in case of variation on the part of one or the other of the mechanisms, to indicate which is overrunning the other.

In the accompanying drawings:

Figure 1 is a plan view of two variable speed mechanisms, on which is mounted the preferred embodiment of the invention.

Figure 2 is a sectional view on an enlarged scale of the indicating mechanism and is taken on the line 2—2 of Figure 1.

Figure 3 is an end elevation looking in the direction of the arrow in the plane 3—3 of Figure 2.

Figures 4, 5 and 6 are sectional views respectively on the lines 4—4; 5—5 and 6—6 of Figure 2.

In the disclosure made in Figure 1, two variable speed mechanisms are employed respectively designated 7 and 8. Each consists of a driving shaft 9 and a driven shaft 10. The shaft 9 in each instance is operated by a motor 11 geared thereto as shown at 12.

The driven shaft 10 is capable of varied speeds with respect to the driving shaft, and in the embodiment shown, each shaft is provided with friction cones 13 engaged by an endless driving belt 14. The cones of each set are movable toward and from each other. These cones are connected to levers 15 fulcrumed between their ends as illustrated at 16, the levers having free ends engaged with nuts on oppositely threaded portions of a shaft 17. The shaft can be turned by any suitable means, as for example, a sprocket chain 18 connected to an actuating shaft 19 provided with a hand wheel 20. It will be evident that when the shaft 17 is turned in one direction, the cones of one set will be moved towards each other, while the cones of the other set will be moved away from each other and a reverse movement of the shaft 17 reverses the movements of the respective cones. Consequently the shaft 10 can be operated at any desired rate of speed with respect to the driving shaft 9. Each of the driven shafts 10 is connected by sprocket mechanism 21 to the machine to be driven through a drive shaft 22.

It will be noted that each of the machines or apparatuses represented by the drive shaft 22 is independently driven and its rate of speed can be the same or different from the rate of speed of the other.

With many machines it is desirable that the two be operated at the same rate of speed, and in order to accomplish this and determine which is running at, for example, a higher rate of speed than the other, the following mechanism is employed. On the driven shaft 10 of one of the speed change mechanisms is mounted a spindle 23 preferably by having its end inserted in a socket 24 formed in the end of the shaft and fixed to said shaft by a suitable set screw 25. The spindle 23 is provided at its free end with an integral head disk 26 preferably formed of hardened steel or like material that is wear-resisting.

On the inner side of the head disk 26 is formed a hub 27, on which is journaled an indicator disk 28, the same being freely revoluble. On the inner side of this indicator disk 28 is another disk 29 that is freely rotatable on the spindle 23 and is in the form of a pulley, being provided with a peripheral groove 30. The disk or pulley 29 has a hub 31 on its outer side, on which is fitted a track washer 32 of hardened steel or like wear-resisting material, this washer being rotatable with the pulley 29. Said pulley is preferably provided with an internal lubricant-receiving channel 33, to which access is gained by a supply passageway 34 leading to the groove 30.

Journaled in the indicator disk 28 are one or more sets of rollers, preferably balls 35, having a common diameter greater than the thickness of the disk so that their peripheries bear against the adjacent faces of the head disk 26 and track washer 32. In order to secure traction bearing of the balls against the disks 26 and washer 32, the pulley 29 is urged towards the indicator disk by a coiled spring 36 surrounding the spindle 23 and interposed between the pulley 29 and the end of the driven shaft 10. The disk 28 may obviously be formed in various ways, but as shown is provided in its outer margin with a series of openings 37, which being beyond the disk 26 and pulley 29, are in full view so that any movement of the disk can be readily noted.

The head disk 26, as stated, is fixed to the driven shaft 10 of one of the change speed mechanisms, and consequently rotates according to the speed of the driven shaft thereof, and consequently at the speed of the prime mover 22 of the machine driven from the motor 11. The corresponding driven shaft 10 of the other change speed mechanism is provided with a pulley 38, around which passes an endless belt 39 that is suitably directed to and is engaged in the groove 30 of the disk or pulley 29. This pulley is rotated from the second speed change mechanism in a direction opposite to the direction of rotation of the head disk 20. The disk 26 and the pulley 29 may be considered actuating devices for the indicator and the operation is as follows:

When the two mechanisms 7 and 8 are in operation and consequently the machines actuated by and through the shafts 22 are in action, each machine may be driven at any desired rate of speed. Where it is desired to operate these machines at the same rate of speed, it is only necessary for the operator to actuate either or both of the hand wheels 20 so as to bring the driven shafts 10 of both machines to a fixed rate of speed, and this rate of speed will be indicated by the action of the indicator disk 28. That is to say, if the pulley 29 is rotated in one direction at the same speed that the head disk 26 is rotated in the opposite direction, the traction on the balls 35 in opposite directions will be the same. Consequently the indicator is stationary and is so held because the balls being distributed around the disk and rotating in opposite directions on axes perpendicular to the axis of the shaft 10 and spindle 23, said disk is in effect locked in said stationary position. But if either of the mechanisms runs at a different rate of speed from the other, then obviously either the head disk 26 runs at a higher rate of speed than the pulley 29, or vice versa. The higher running actuating member or device is then causing the balls to run upon the slower moving actuating device and have traction thereon. As a consequence the disk 28 will rotate in one direction or the other, depending on which of the devices 26 or 29 is operating at the higher rate of speed. A rotation therefore of the indicator disk 28 in one direction shows that one of the machines is running at the greater speed and the operator only has to slow down the driven shaft and consequently that machine until the disk again becomes stationary.

It will be evident that indicating mechanism of a very simple character is provided by which two machines can be brought to the same rate of speed, or if it is desired to run one at a different rate of speed from the other, this can also be accomplished and the indicator will determine the same. Moreover it permits the cooperating machines to be speeded up or slowed down and brought to the same rate of speed with the greatest ease and expedition.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. In indicating mechanism, the combination with a rotatable indicator having visible means for observing its movement, of oppositely rotatable actuating devices on opposite sides of the same, means for driving the actuating devices in opposite directions, and roller elements journaled in the indicator and having traction bearings on the actuating devices.

2. In indicating mechanism, the combination with a shaft rotatable in one direction, and means for rotating the shaft, of an indicator rotatable on the shaft and having visible means for observing its movement, an actuating disk fixed to the shaft on one side of the indicator, a second actuating disk journaled on the shaft on the other side of the indicator and rotatable in a direction opposite to that of the shaft, means for rotating the disk, and balls journaled in the indicator and having peripheral bearings against the adjacent sides of the disks.

3. In indicating mechanism, the combination with a shaft having a head disk, of means for rotating the shaft in one direction, an indicator freely rotatably mounted on the shaft alongside the head disk, a second disk journaled on the shaft on the opposite side of the indicator, means for rotating said second disk in a direction opposite to that of the shaft, a plurality of rollers journaled in the indicator and having peripheral bearings against the adjacent faces of the disks, said rollers operating to rotate the indicator in opposite directions depending upon the relative speeds of the disks, and means for yieldingly urging the disks into bearing engagement with the said rollers.

4. In indicating mechanism, the combination with an indicator member free to rotate in opposite directions and having its peripheral portion provided with visual means to observe its rotation, oppositely rotatable actuating members on opposite sides of the indicating member, and means for rotating the actuating members, and rotatable elements mounted in the indicating member bearing against the actuating members to be rotated thereby on their opposite rotation and to rotate the indicator member when the actuating members are driven at different speeds.

5. In indicating mechanism, the combination with a driven shaft, of an indicator disk journaled on the shaft and rotatable in opposite directions, an actuating disk of less diameter than the indicator disk fixed to rotate with the shaft, a second actuating disk rotatably mounted on the shaft and located on the opposite side of the indicator disk, means for rotating the second actuating disk in an opposite direction to that of the shaft, rolling elements journaled in the indicator disk and having rolling contact with the opposing surfaces of the actuating disks to cause the rotation of the indicator disk when the actuating disks are rotated in opposite directions at relatively different rates of speed, and means for yieldingly urging the disks towards one another.

ALBERT BROADMEYER.